Feb. 3, 1942. D. E. CRABB 2,271,913
ADJUSTABLE SEAT
Filed Nov. 7, 1934 3 Sheets-Sheet 1

Inventor:
Donald E. Crabb

Feb. 3, 1942.  D. E. CRABB  2,271,913
ADJUSTABLE SEAT
Filed Nov. 7, 1934   3 Sheets-Sheet 2
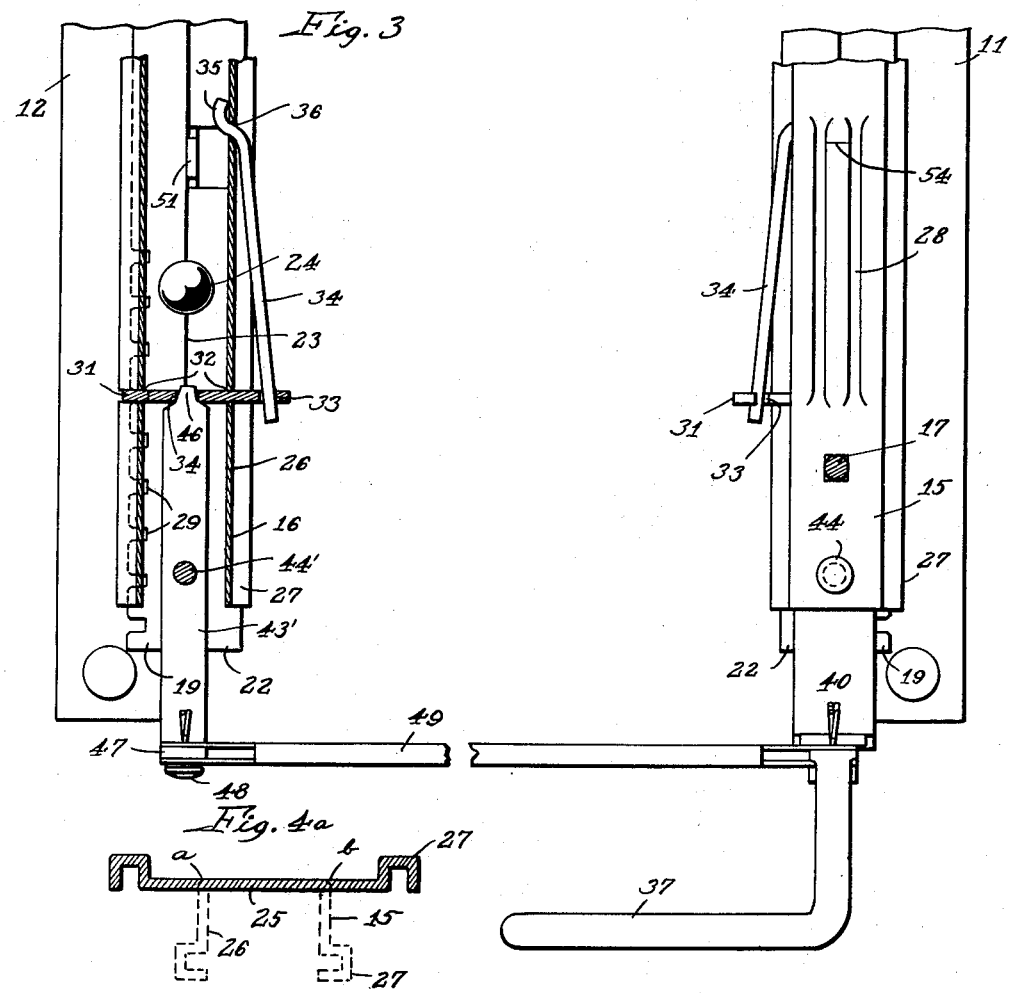
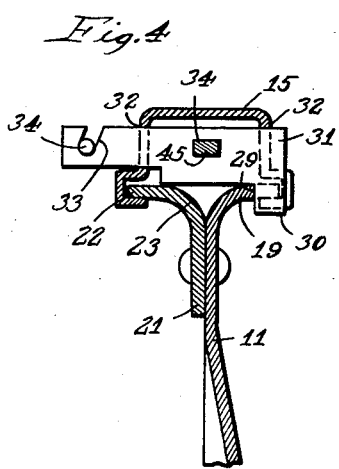
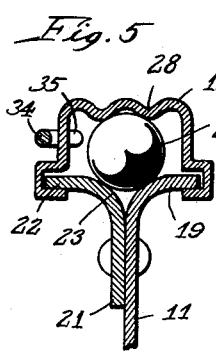
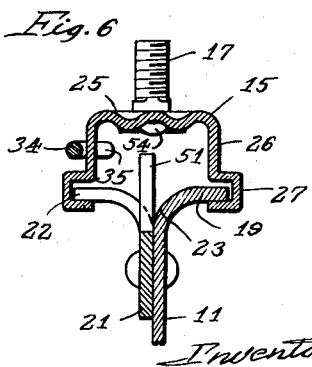
Inventor:
Donald E. Crabb
By Wilson, Dowell, McCanna & Wintercorn
Attys.

Feb. 3, 1942.   D. E. CRABB   2,271,913
ADJUSTABLE SEAT
Filed Nov. 7, 1934   3 Sheets-Sheet 3
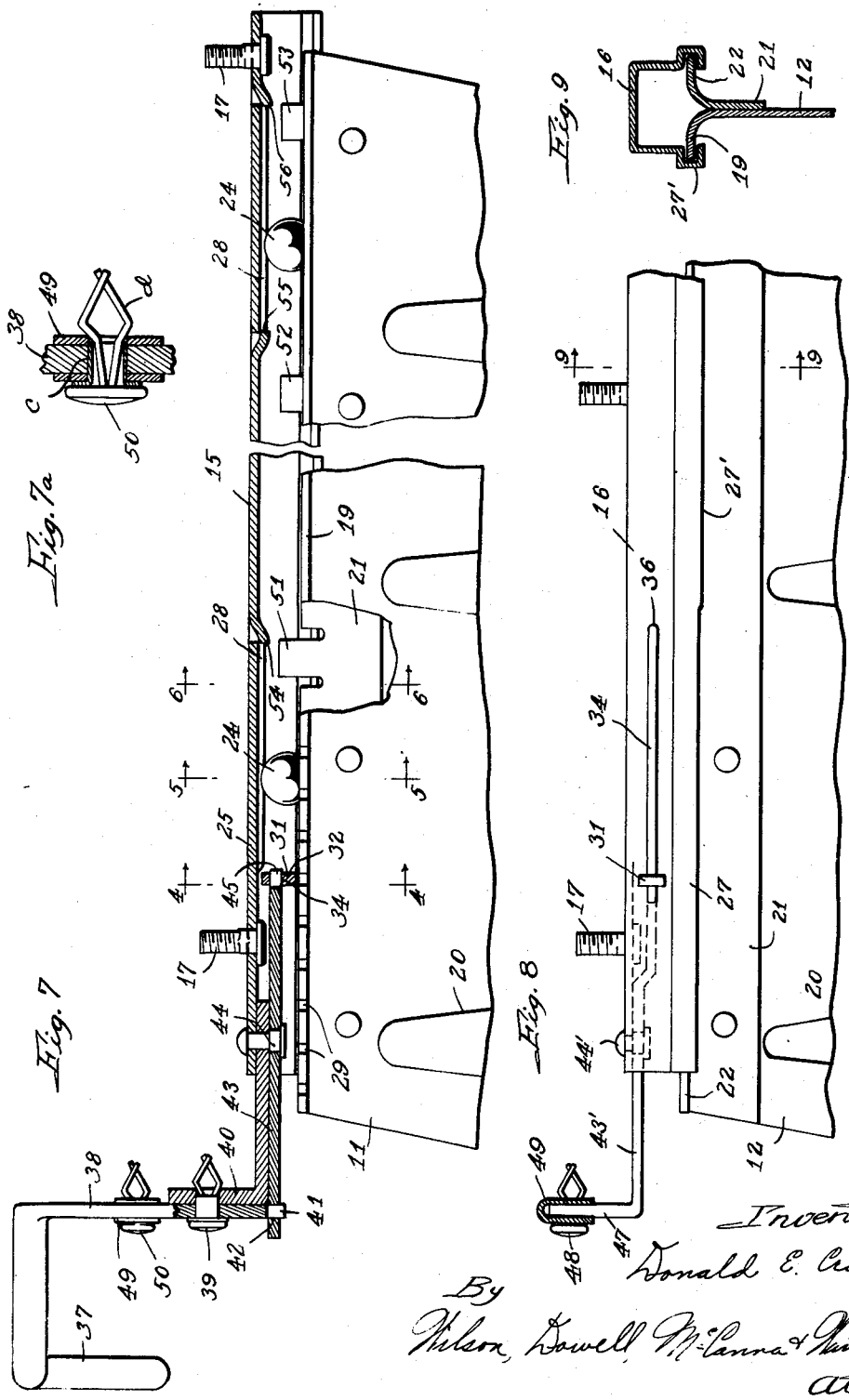
Inventor:
Donald E. Crabb
By
Wilson, Lowell, McCanna & Finterson
Attys.

UNITED STATES PATENT OFFICE 2,271,913

ADJUSTABLE SEAT

Donald E. Crabb, Detroit, Mich., assignor to The Atwood Vacuum Machine Company, Rockford, Ill., a copartnership composed of Seth B. Atwood and James T. Atwood Application November 7, 1934, Serial No. 751,871

4 Claims. (Cl. 155—14)

This invention relates to adjustable seats especially designed and adapted for use in vehicles such as automobiles.

The principal object of my invention is to provide a seat of the type which is slidable for adjustment and in which the slidable mounting is of extremely simple and practical, as well as economical, construction to meet all requirements in the present day motor car, the mounting, furthermore, incorporating ball bearings to eliminate sticking and binding of the parts and enable easy and quiet operation.

In accordance with my invention, the tracks, slides, latches and latch operating means are all made of sheet metal stampings so designed as to use minimum material and require the smallest amount of forming, with a view to lightness and cheapness and still not sacrifice strength and durability. The parts are, furthermore, so constructed and arranged as to greatly facilitate assembling or disassembling, and thus further reduce the cost of these units.

The invention is illustrated in the accompanying drawings, in which—

Fig. 3 is a plan view of Fig. 2 showing the left hand slide and its latch in horizontal section;

Figs. 4, 5 and 6 are vertical, sectional details on the correspondingly numbered lines of Fig. 7;

Fig. 4a is a view showing the method of forming the slides;

Fig. 7 is a longitudinal section through the right hand slide, as indicated by the line 7—7 in Fig. 2;

Fig. 7a is an enlarged sectional detail of one of the snap fasteners used as pivots for the handle and cross-link;

Fig. 8 is a side view of the left hand slide and track, this view being taken on the line 8—8 of Fig. 2, and Fig. 9 is a sectional detail on the line 9—9 of Fig. 8.

The same reference numerals are applied to corresponding parts throughout the views.

Figure 1:
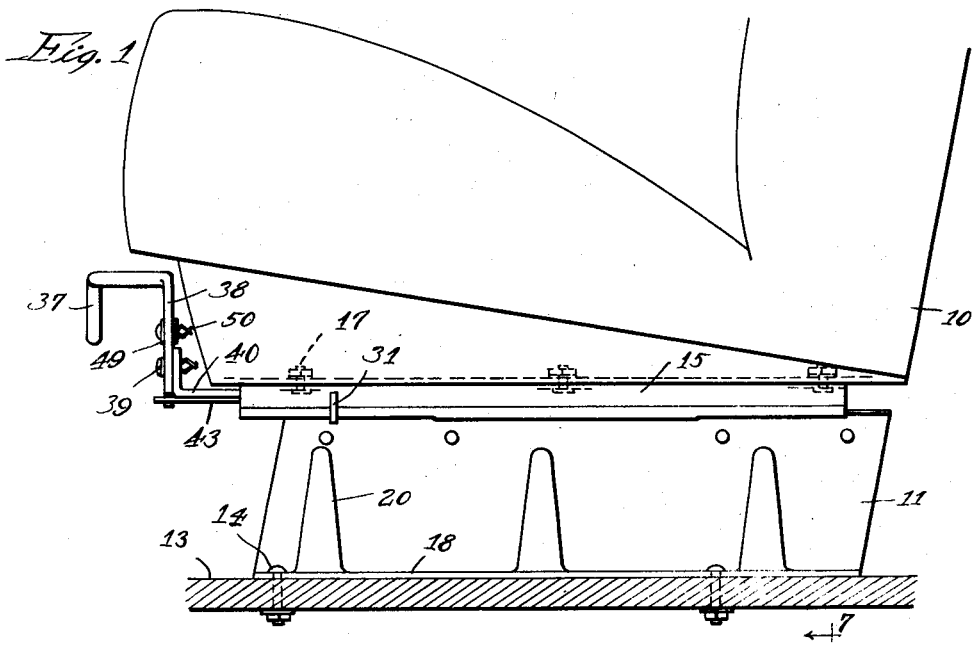
Figure 1 is a side view of an adjustable seat embodying my invention.

The seat 10, in connection with which my invention is illustrated, may be either a single seat such as is usually made adjustable for the driver, or may be a double seat reaching the full width of the vehicle body. In accordance with my invention, tracks 11 and 12 suitably secured to the floor 13, as by bolts 14, have slides 15 and 16 operating on the top thereof and suitably secured to the bottom of the seat, as by bolts 17. The tracks 11 and 12 are stamped from sheet metal and formed to provide bottom bolting flanges 18 and top track flanges 19. Vertical ribs 20 are also formed in the tracks between the flanges at a number of points spaced lengthwise thereof to lend strength and rigidity so that the seat will not wabble. Additional strips 21 of angular cross-section are riveted to the tracks along the top and provide companion track flanges 22 extending in the opposite direction from the flanges 19. V-shaped grooves 23 are thus formed extending lengthwise of the tops of the tracks at the middle which, as will presently appear, are used as raceways for bearing balls 24. The slides 15 and 16 are also stamped from sheet metal and formed to inverted channel shaped cross-section to provide a top wall 25 to fasten to the bottom of the seat by bolts or studs 17 and spaced side walls 26, the lower edges of which are formed in the manner indicated in Fig. 4a to provide channel shaped guides 27 to receive the flanges 18 and 22 of the tracks. Fig. 4a shows clearly that the channel guides 27 are formed in the piece while flat, thus permitting easy withdrawal of the die; then the piece is bent at a and b to form a channel, with the channel guides 27 projecting outwardly from the side walls of the channel, so that the die can be easily withdrawn from inside the channel. The channel-shaped guides 27 are considered an important improvement over ordinary inturned flanges provided heretofore for guiding the slides on the track flanges. They make for easier operation and less tendency for binding, without any increase in the cost of production. The top wall 25 is struck at two points near the front and rear ends of the slides to crimp the metal longitudinally in two parallel lines, as indicated at 28 in Figs. 3, 6 and 7, to provide upper raceways for the bearing balls 24. The balls are fully enclosed in the slides by virtue of the construction herein disclosed, so that dirt and grit will not enter and interfere with the easy and quiet operation of this ball bearing structure. The raceways 23 and 28 will, of course, be lubricated at the time of assembling to insure easier operation and the same is true of the guides 27 for the track flanges 19 and 22. The only sliding friction in this construction is where the guides 27 have the lower flanges thereof engaging the bottom of the flanges 19 and 22 only along the front and rear ends of the slides but these, of course, are not load bearing surfaces. The intermediate portion of the guides are made wider, as indicated at 27' in Fig. 8. The fact that this construction employs rolling friction exclusively between the load bearing surfaces makes for easier and more quiet operation.

The track flanges 19 are notched out at regular intervals for a certain distance at the front ends, as indicated at 29 in Figs. 3 and 7, to receive a depending lug 30 on the latches 31 slidable transversely in the slides 15 and 16 in vertical slots 32 provided therefor in the side walls 26. The latches 31 are punched from sheet metal at low cost and have an inwardly inclined slot 33 made in that end thereof opposite the lug 30, and a substantially horizontal slot 34' made therein intermediate the ends. The slot 33 in each latch receives the free end of a short stiff wire spring 34 that has a hooked end 35 anchored in a hole 36 in the side wall of the slide. The spring normally urges the latch inwardly to engage the lug 30 in a notch 29 and thus lock the slide against endwise movement relative to its associated track. I have arranged to operate the two latches simultaneously in the opposite direction to release the seat for adjustment forwardly or rearwardly. I provide a handle 37 on an oscillating lever 38 pivoted, as at 39, on a bracket 40 extending forwardly from the slide 15. The handle is thus located in front of the seat where it is conveniently accessible to a person while sitting on the seat. The lower end of the lever 38 has a tooth 41 entered in a hole 42 in the front end of a horizontal lever 43, pivoted at 44, intermediate its ends in the front end of the slide 15, on the same pivot that fastens the bracket 40 to the slide. The other end of the lever 43 has a tooth 45 entered in the slot 34' of the latch 31 of slide 15. A somewhat similar lever 43' is pivoted on another rivet 44' in the front end of the slide 16 and has a tooth 46 on the inner end engaged in the slot 34' in the latch 31 of slide 16. The other end of the lever 43' is bent upwardly, as at 47, and pivotally connected, as at 48, to one end of a cross-link 49 whose other end is pivoted, as at 50, to the aforementioned hand lever 38. The link 49 is preferably formed from sheet metal to channel-shaped cross-section so as to provide spaced ears at both ends to receive the parts 38 and 47 and permit entry of pivots 48 and 50 through registering holes therein for quick and easy assembly, as well as economy in construction. The pivots 39, 48 and 50 are all of the type illustrated in Fig. 7a, consisting of a grommet c entered in registering holes in the ports and receiving the button headed snap-in staple d that serves to hold the parts together on the grommet. The advantage in using these snap fastener type pivots is that the handle 37 and link 49 can be shipped for assembly on the car at the factory, and the handles, which will be suitably plated or otherwise specially finished, will not be marred by contact with tracks and slides. Furthermore, the slide and track assemblies, without the handles projecting therefrom, are easier to pack.

Figure 2:
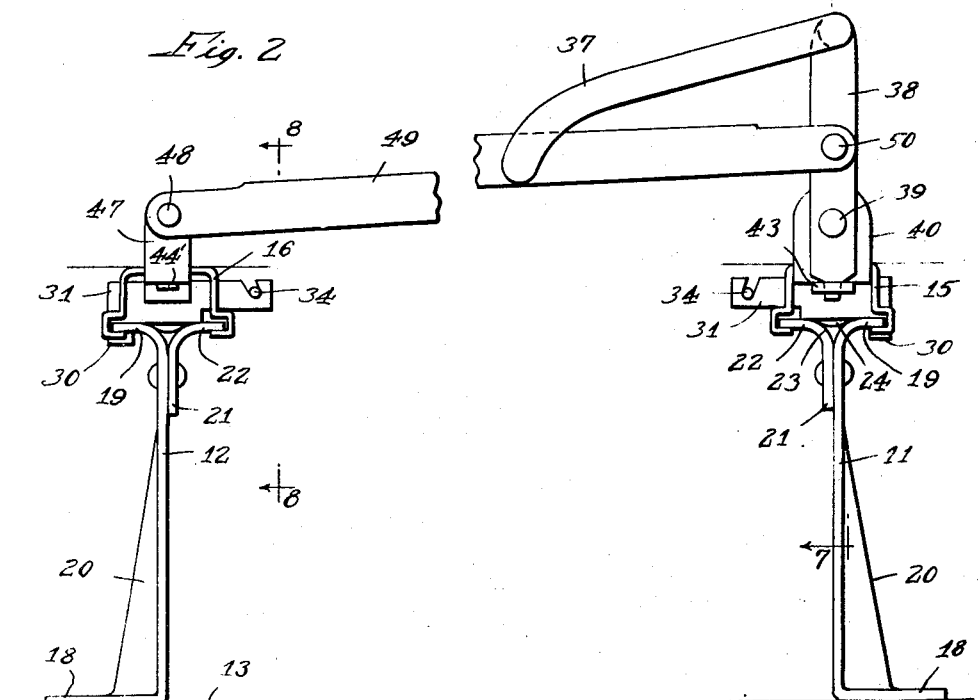
Fig. 2 is a front view of the tracks and slides showing, in a general way, the latches and the operating means therefor, a portion of the connecting cross-link being broken away so as to enable showing the structure on a larger scale.

In operation, it is clear that when the handle 37 is pulled upwardly, the lever 38 is moved in a clockwise direction, as viewed in Fig. 2, and accordingly moves the outer end of the lever 43 to the left and the outer end of the lever 43' to the right. Since the levers 43 and 43' are pivoted intermediate their ends, the latch 31 of slide 15 will accordingly be moved to the right and the latch 31 of slide 16 to the left, against the action of their springs 34. The seat is accordingly released by reason of the disengagement of the lugs 30 from the notches 29. The latches are limited in their movement in one direction by the engagement of the inner ends of the levers 43—43' with the side walls of the slides so that the lugs 30 move out only far enough to clear the edges of the flanges 19. In the other direction of movement, the latches are limited by the engagement of the lugs 30 in the bottom of the notches 29. The seat when released actually rolls by virtue of the ball bearings 24, there being a minimum of sliding friction between the slides and tracks, especially since the slides are formed intermediate the ends, as at 27', so as to engage only at the ends with the track flanges. The seat will be free to slide so long as the handle 37 is pulled upwardly, and just as soon as the handle is released the latches 31 move under the action of their spring 34 toward locking position and will engage in whatever notches 29 come into register with them. There are lugs 51—53 struck upwardly from the flanges 22 as shown in Figs. 6 and 7, and lugs 54—56 struck downwardly from the slides at the ends of the raceways 28 for engagement with the balls 24 to positively limit movement of the seat, and also move the balls backs into place if they happen to get to one end of the raceways when they should be at intermediate positions. A sufficient range of movement is allowed so that the latches 31 may be entered in any one of the series of notches 29 on the two tracks. The latches 31 will serve the same purpose as the lugs 55, so far as engaging the balls 24 in rearward movement is concerned. In rearward movement the lugs 51 and 53 cooperate with latches 31 and lugs 55, respectively, the balls 24 being engaged therebetween at the limit of movement. In forward movement the lugs 54 engage the front balls, and the lugs 56 cooperate with lugs 52 and the rear balls.

The slides and tracks are shipped to the automobile manufacturer fully assembled. The only operations left are to fasten the tracks to the floor and the slides to the seat, and connect the cross-link 49 with the levers 38 and 47. Each slide in the first instance is assembled on its track in the following manner: Everything is assembled on the slide as the parts appear in Figs. 7 and 8; the track is the same as it appears in Fig. 7 except that the rearmost lug 53 is not bent up but is lying down in the plane of the flange 22; the slide is slid rearwardly over the flanges 19 and 22 until the latch 31 is near the front end of the track, whereupon the front ball is inserted behind the latch and the slide is moved to the rear with it; then the slide is moved to the rear far enough for the other ball to be inserted in front of the lug 56, and the slide is moved forwardly again far enough for the ball to get in front of the lug 53, and then this lug is bent upwardly by means of a suitable tool, thus completing the assembly. Obviously, it takes very little time to perform these simple operations. Such lubricant as is desired may be placed either in the raceways 28 or 23, or both, prior to the assembling of the unit. Should any further lubricant be desired later, it can be supplied through the openings where the lugs 51, 52 and 53 are struck up, or else through the front and rear ends of the unit.

It is believed the foregoing description conveys a good understanding of the objects and advantages of my invention. The appended claims have been drawn with a view to covering all legitimate modifications and adaptations.

I claim:

1. As an article of manufacture, a seat support adapted to be fastened to a floor and to the bottom of a seat, said support comprising a track arranged to be fastened to the floor, said track having oppositely directed longitudinal flanges on the top thereof, a slide of inverted channel cross-section arranged to be fastened by its top wall to the bottom of a seat in alignment with the track, rolling elements operating on top of the track and having the slide resting thereon to bear the load of the seat with rolling friction, the side walls of the slide having longitudinal inwardly facing channel-shaped portions receiving the aforesaid flanges, the channels being narrower at certain points for sliding engagement with the bottom of the flanges, normally under no load, but only to guide the slide for endwise movement on the track.

2. As an article of manufacture, a seat support adapted to be fastened to a floor and to the bottom of a seat, said support comprising two tracks arranged to be fastened to the floor in spaced parallel relation, slides movable endwise on the tracks and arranged to be fastened to the bottom of a seat, latch means on each of said slides holding the slides releasably in adjusted position, an oscillating lever projecting forwardly from each of said slides and arranged to operate the latch means, a handle support on one of said slides adjacent the lever thereon, an operating handle arranged to be detachably pivotally mounted on said support in detachable operating connection with the adjacent lever, and a cross link extending from one slide to the other and arranged to be detachably pivotally connected at one end to the handle and at the other end to the other lever.

3. As an article of manufacture, a seat support adapted to be fastened to a floor and to the bottom of a seat, said support comprising a track arranged to be fastened to the floor, said track having oppositely directed longitudinal flanges on the top thereof, a slide of inverted channel cross-section arranged to be fastened by its top wall to the bottom of a seat in alignment with the track and having guide portions on the side walls engaging the flanges, a latch mounted on said slide for reciprocation transversely with respect to the longitudinal flanges and having portions arranged to engage in notches provided therefor in the longitudinal edge of one of said flanges in longitudinally spaced relation, a handle supporting bracket extending forwardly from the end of the slide and fastened to the top wall thereof, the bracket having an upturned front end, an oscillating lever mounted below the bracket for oscillating movement inside the slide and pivotally connected at its rear end with said latch, the front end of said lever projecting forwardly beyond the upturned front end of said bracket, and a handle for operating said lever mounted on said upturned front end for oscillating movement and pivotally connected to the front end of said lever.

4. An article of manufacture as set forth in claim 3, including a second track in laterally spaced parallel relation to the first track having oppositely directed longitudinal flanges on the top thereof, a second slide of inverted channel cross-section arranged to be fastened by its top wall to the bottom of the seat in alignment with the track and having guide portions on the side walls engaging the flanges, a latch mounted on said slide for reciprocation transversely with respect to the longitudinal flanges and having portions arranged to engage in notches provided therefor in the longitudinal edge of one of the flanges in longitudinally spaced relation, an oscillating lever mounted inside the slide for oscillating movement and pivotally connected at its rear end with the latch, and a cross link for oscillating said lever extending from the forward end of said lever toward the first-mentioned track and operatively connected with the mechanism on the first-mentioned slide, whereby the second latch is arranged to be released substantially simultaneously with the latch on the first slide.

DONALD E. CRABB.